(12) United States Patent
Weston

(10) Patent No.: US 8,376,377 B2
(45) Date of Patent: Feb. 19, 2013

(54) SUPERMARKET CAGE PROTECTION DEVICE

(75) Inventor: Walter Stephen Weston, Lancashire (GB)

(73) Assignee: Technological Systems Limited, Bury, Lancashire (GB)

( * ) Notice: Subject to any disclaimer, the term of this patent is extended or adjusted under 35 U.S.C. 154(b) by 586 days.

(21) Appl. No.: 12/526,875

(22) PCT Filed: Feb. 13, 2008

(86) PCT No.: PCT/GB2008/050092
§ 371 (c)(1),
(2), (4) Date: Aug. 12, 2009

(87) PCT Pub. No.: WO2008/099213
PCT Pub. Date: Aug. 21, 2008

(65) Prior Publication Data
US 2010/0090430 A1 Apr. 15, 2010

(30) Foreign Application Priority Data
Feb. 15, 2007 (GB) .................................. 0702903.6

(51) Int. Cl.
*B62D 39/00* (2006.01)
(52) U.S. Cl. ............ 280/87.021; 280/33.992; 280/47.34
(58) Field of Classification Search ................ 280/87.01, 280/87.021, 47.34, 79.2
See application file for complete search history.

(56) References Cited

U.S. PATENT DOCUMENTS 2,891,802 A * 6/1959 Moran ........................... 280/654
3,383,133 A * 5/1968 Dean ................................ 296/98
(Continued)

FOREIGN PATENT DOCUMENTS

DE 10050915 4/2002
EP 1428763 6/2004
(Continued)

OTHER PUBLICATIONS

PCT International Search Report for PCT/GB2008/050092, Mar. 23, 2008, 5 pages.

*Primary Examiner* — Hau Phan
*Assistant Examiner* — Jacob Meyer
(74) *Attorney, Agent, or Firm* — Reising Ethington P.C.

(57) ABSTRACT

In order to temporarily close off the open end or ends of a supermarket cage to reduce risk of products falling out, a supermarket cage protection device is proposed which comprises a roller (16) mounted between respective brackets (30) which are adapted to be fitted removably to opposing upper regions of opposing side frames (22) of a supermarket cage (20). A sheet of flexible material (12) is mounted upon and extensible from the roller (16) so as to cover, in use, an open end of the supermarket cage. Means for releasably securing the sheet (12) when so extended may comprise a channel element (14) providing a hook to engage a bottom cage element and optionally a grip portion (45) to facilitate its release. In its simplest form such a device is, in effect, a roller blind adapted for fitting to a delivery cage.

17 Claims, 9 Drawing Sheets

U.S. PATENT DOCUMENTS

| | | | | |
|---|---|---|---|---|
| 3,514,123 A * | 5/1970 | Injeski | | 280/652 |
| 3,994,505 A * | 11/1976 | Balha | | 280/33.994 |
| 4,160,557 A * | 7/1979 | Taylor | | 280/652 |
| 4,247,130 A * | 1/1981 | Paterson | | 280/654 |
| D267,359 S * | 12/1982 | Mustard | | D34/26 |
| 4,846,427 A * | 7/1989 | Jones | | 248/95 |
| 4,927,104 A * | 5/1990 | Miller | | 248/97 |
| 5,036,898 A * | 8/1991 | Chen | | 160/23.1 |
| 5,054,533 A * | 10/1991 | Lii | | 160/302 |
| 5,118,130 A * | 6/1992 | Kaltz | | 280/654 |
| 5,271,634 A * | 12/1993 | Walton | | 280/33.992 |
| 5,328,182 A * | 7/1994 | Kuo | | 280/5.32 |
| D366,548 S * | 1/1996 | Morasse | | D34/24 |
| 5,772,370 A * | 6/1998 | Moore | | 410/100 |
| 5,779,084 A * | 7/1998 | Lehman | | 220/200 |
| 5,836,332 A * | 11/1998 | Mick | | 135/124 |
| 6,193,247 B1 * | 2/2001 | Spear et al. | | 280/33.998 |
| 6,367,822 B1 * | 4/2002 | Hutchins | | 280/47.24 |
| 6,450,513 B1 * | 9/2002 | Bernstein | | 280/33.992 |
| 6,547,309 B1 * | 4/2003 | Franklin et al. | | 296/98 |
| 6,598,651 B2 * | 7/2003 | Ehrenberger et al. | | 160/238 |
| 6,666,465 B2 * | 12/2003 | Chan | | 280/47.26 |
| D537,603 S * | 2/2007 | Oh | | D34/24 |
| D557,473 S * | 12/2007 | Oh et al. | | D34/24 |
| 2006/0175778 A1 * | 8/2006 | Rose et al. | | 280/33.992 |

FOREIGN PATENT DOCUMENTS

GB        2341160        3/2000

* cited by examiner

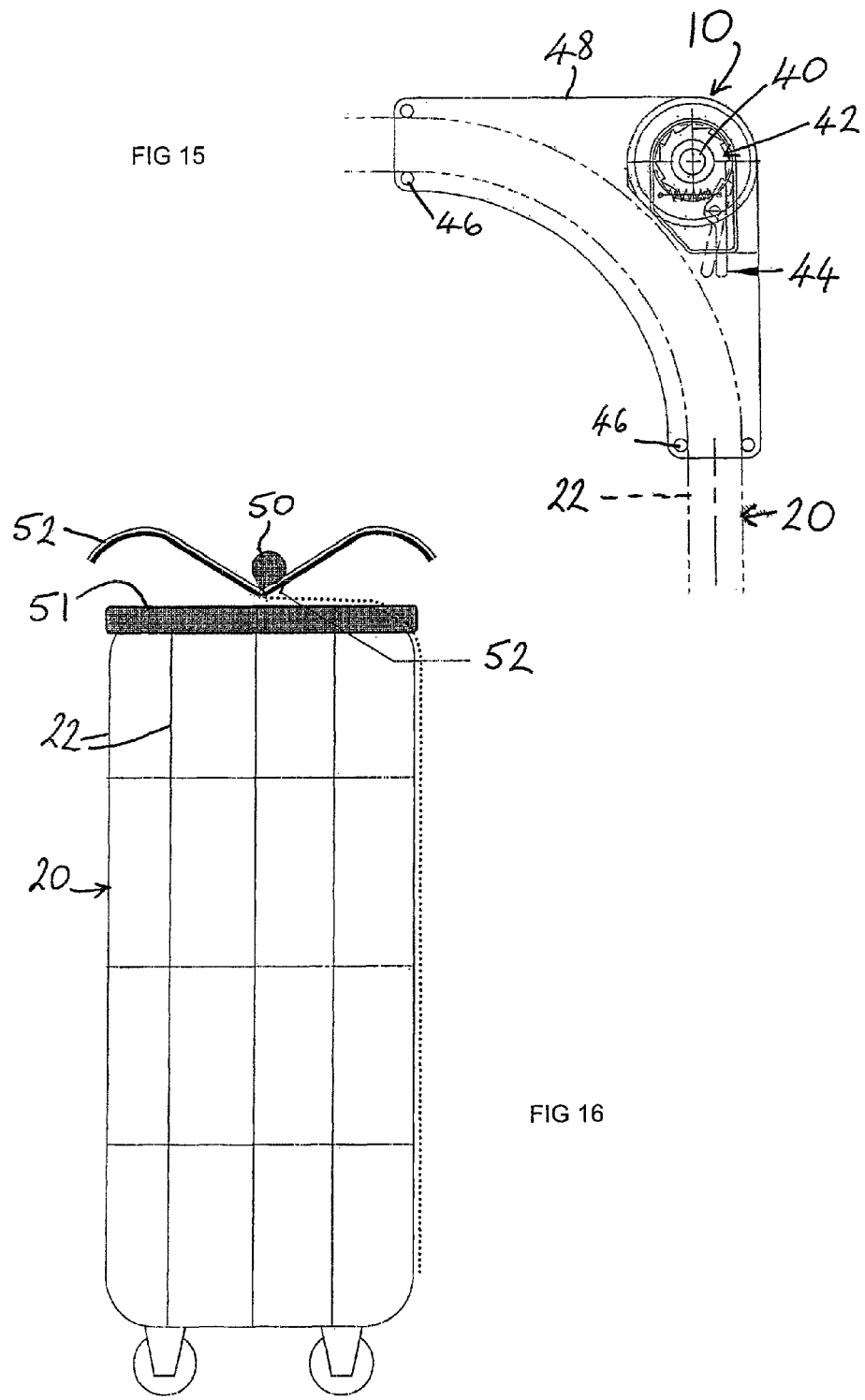

SUPERMARKET CAGE PROTECTION DEVICE

The present invention concerns a protection device for a supermarket delivery cage and also a stacking device for a supermarket delivery cage.

Supermarket delivery cages are used to bring packs of products from storage areas, often in remote warehouses, thus involving transport in vehicles, to supermarket shelves, where the cages are unloaded to refill the shelves. Typically a supermarket cage comprises a wheeled base and opposing side frames mounted onto the base, leaving opposing open ends. However, some cages have a further upright frame at one end, or one or more cross-pieces tying the side frames together at one end, thus leaving only one end open.

Modern stock control systems involve rapid restocking of shelves and this, in turn, usually requires transport of packs of many different types of products within each cage.

Such packs will be of varying shape and size and they may not be neatly or stably stacked within a cage. In warehouses/distribution centres, packed cages are transported on conveyors. Unevenness and vibration lead to frequent falling of packs from the open end or ends of the cages during such transport, resulting in damage, spills and product wastage as well as occasional disruption to the conveyor system. Overall there is significant economic loss. Potential for packs of produce falling out of cages also poses a risk of injuring operatives and any third parties nearby when cages are wheeled along within warehouses or in supermarkets.

Proposals have been made, e.g. in EP-A-1428763, for placing flexible sheet material across the open ends of supermarket cages and securing it with straps. Pallet covers of various types are also known, having corner seams and tensioning straps and making use of hook and loop material for releasable attachment. None of these is particularly satisfactory owing to the amount of manipulation required by operatives to fit and remove such covers and general unreliability in preventing products falling out.

An object of the present invention is to tackle the problems just outlined and provide alternative means, which is simpler to put into effect than any previously known measure, of temporarily closing off the open end or ends of a supermarket cage to reduce risk of products falling out.

According to the invention a supermarket cage protection device is proposed which comprises at least one roller mounted between respective brackets which are adapted to be fitted removably to opposing upper regions of opposing side frames of a supermarket cage, a sheet of flexible material mounted upon and extensible from the or each roller so as to cover, in use, at least one open end of the supermarket cage, and means for releasably securing the sheet when so extended.

In its simplest form such a device is, in effect, a roller blind adapted for fitting to a delivery cage.

Just as with a conventional roller blind, a ratchet mechanism may be associated with at least one of the brackets to control or limit rotation of the roller or at least one of the rollers, when there is more than one.

Also, just as with the conventional roller blind, a spring mechanism may be associated with the or at least one of the rollers to enable automatic rewinding of the flexible sheet subsequent to its extension.

In order to secure a lower part of the flexible sheet to a lower part of the cage when the sheet has been extended from the roller, at least one hook formation is conveniently provided at or near the outer (lower) edge of the flexible sheet.

Such a hook formation may take the form of individual hooks or of a profiled strip mounted along the outer edge of the flexible sheet for ready attachment to the base of the cage or a part adjacent to base, such as specific engagement projections on side frame members.

The means for releasably securing the flexible sheet preferably includes a portion which can be gripped in order to effect securement and/or release of said sheet. This should facilitate either manual action to effect attachment or release or automated attachment and/or release by robotic gripper means.

Several different versions of protection device in accordance with the invention are envisaged.

A first version of the device comprises a single roller mounted between the respective brackets which are adapted to be fitted removably at opposing upper corner regions of the side frames at the open end of a supermarket cage.

The brackets of such a device may be provided at opposing ends of an elongate strut, or a strip of L-section or part circular profile, or any other elongate element, which may be in the form of a pelmet, which serves to maintain a fixed spacing between the side frames of the cage.

A second version of the device comprises two rollers mounted in substantially parallel disposition between the respective brackets, the rollers each having a flexible sheet of material wound thereon and being so arranged that the respective sheets are initially extensible in generally opposing directions from the respective rollers. In this case the respective brackets would be mounted generally in the middle of the upper part of the respective side frames so that the respective flexible sheets would be pulled outwards towards each end of the cage.

A third version of the device would effectively combine the first and second versions. As in the second version, two rollers would be mounted in substantially parallel disposition between the respective brackets, the rollers each having a flexible sheet of material wound thereon. However, the respective brackets would be mounted at or near opposing upper corner regions of the side frames, as in the first version so that the respective flexible sheets would be initially extended from the respective rollers in directions generally perpendicular to each other, one downwards over the open end and the other in a direction across the top of the cage. The latter sheet would be longer to cover both the top and one end of the cage.

In preferred embodiments of the second and third versions of the device, a least one top extension is connected to the bracket and adapted for extending at least partially across an upper region of the space defined between the side frames of the cage.

The or each top extension may be hingedly connected to the brackets and will preferably serve as guide means for extension of the flexible sheet material from at least one of the rollers.

Additionally, the or each top extension may provide support means for wheels of a further supermarket cage which may be stacked thereabove.

A fourth version of the device comprises two rollers mounted in substantially parallel disposition between respective pairs of brackets which are connected to each other by top connector means. In this case each pair of brackets would probably be mounted at opposing upper corner regions of the side frames of the cage with the top connector means extending between the respective pairs of brackets.

The top connector means may then be in the form of a top cover, covering substantially the whole of the top of the cage. However, the top connector means may not form a complete cover and may simply comprise elongate fitments mountable to upper parts of the side frames so as to extend between the brackets at or near each end of the cage.

The top connector means of whichever form may again provide support means for wheels of a further supermarket cage which may be stacked thereabove.

Such support means, whether provided in top cover portions or top connector means as mentioned above, may comprise wells or grooves or ledges adapted for reception of the wheels of the said other cage or may comprise apertures of a size to permit the wheels of said other cage to rest upon edges of said apertures.

A further problem associated with conventional supermarket delivery cages is that their current standard height is greater than half the height of conventional delivery trucks so that there is considerable wasted volume in the empty upper region of each delivery truck. If the standard height of delivery cages were to be reduced it would be desirable to provide for stacking so that a second layer of cages could be accommodated within delivery trucks.

The aforesaid top extensions or top connector means of the proposed protection device can provide for such stacking as already mentioned. However, a further aspect of the present invention is separate provision for such stacking, that is to say separate from provision of a roller blind style of protection device to safeguard against falling out of loaded packs.

According to such further aspect of the invention, a supermarket cage protection device is proposed comprising a top cover mounted between respective brackets which are adapted to be fitted removably to opposing upper regions of opposing side frames of a supermarket cage, said top cover including support means for wheels of a further supermarket cage which may be stacked thereabove.

According to such further aspect of the invention, a supermarket cage stacking device is also proposed comprising a fitment which is adapted to be mounted removably to an upper region of a side frame of a supermarket cage and which includes support means for wheels of a further supermarket cage which may be stacked thereabove.

Various embodiments of the first aspect of the invention will now be described further, by way of example, with reference to the accompanying drawings, in which:

FIG. 1 is a partial perspective view of an upper region of a supermarket cage to which a first embodiment of a protection device in accordance with the invention has been fitted, the device being in a partially extended condition;

FIG. 2 corresponds to FIG. 1, but shows the cage and the device from the other side and slightly below;

FIG. 13 is an enlarged scale cross-section through the reel assembly of FIG. 12 showing how the aforesaid flexible sheet material is to be mounted there to;

FIG. 15 is a fragmentary side view showing another form of bracket which is part of a second embodiment of a protection device in accordance with the invention; and FIG. 16 is a schematic side view showing a third embodiment of a protection device in accordance with the invention fitted to a supermarket cage.

Figure 13:
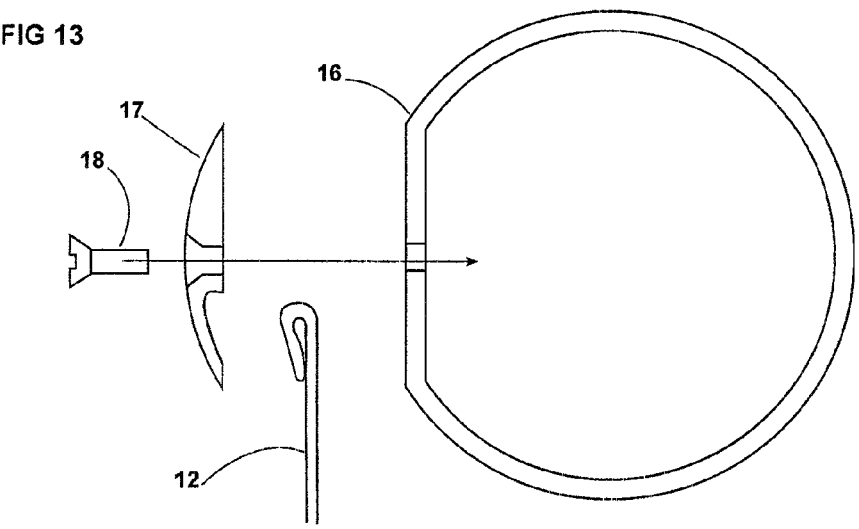
Figure 14:
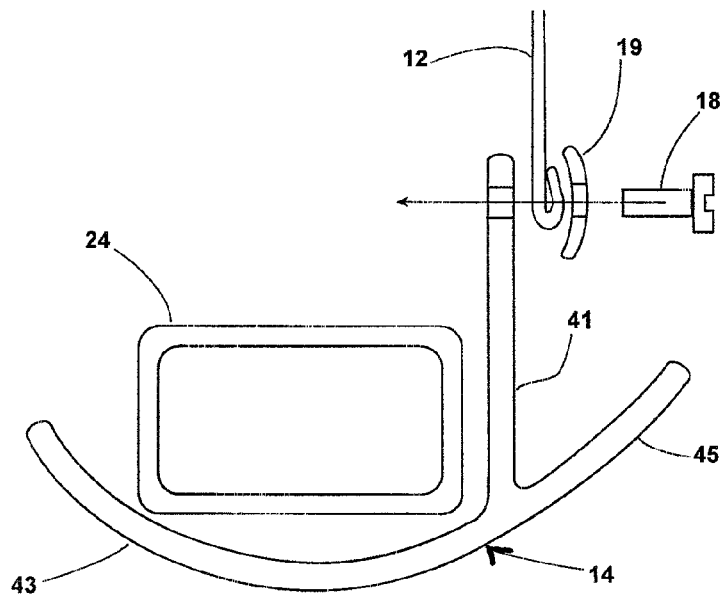
FIG. 14 is a similarly enlarged scale cross-section showing attachment of a hook profile at the lower end of the flexible sheet material of the protection device of the invention and engagement of same with a lower cage frame element.

Referring to FIGS. 1 to 14, a preferred practical embodiment of the protection device of the invention comprises an elongate roller assembly 10 mounted between respective brackets in the form of respective end cap assemblies 30 whereby they can be attached onto opposing upper corners of side frames 22 of a supermarket cage 20. The roller assembly 10, best shown in FIGS. 5, 11 and 12, comprises a sheet 12 of flexible material, such as nylon, wound onto a tubular carrier (roller) 16 in the manner of a roller blind. A channel element 14 is mounted along the free end of the material 12, as shown in FIG. 14, to provide hook means.

As shown in FIGS. 1 to 4, the flexible sheet 12 can be pulled down in the manner of a roller blind to close off an open end of the cage 20. This can be accomplished by manually grasping the channel element 14 and pulling the free edge down and engaging the channel element 14 with a bottom frame portion 24 of the cage 20. The roller assembly 10 includes ratchets 26 (see FIG. 11) which allow the sheet 12 to be pulled down, but prevent it being rewound until the ratchets 26 are released by operation of release levers 28. A rewind mechanism for the roller 16 is provided as for a conventional roller blind.

By further operation of the lever 28 the flexible sheet 12 can be maintained in a taut condition once it is extended from the roller 16 and engaged on to the bottom frame portion 24 by means of the channel element 14. This should be sufficient to prevent it bulging outwards or giving way in the event of any part of a load in the cage 20 being dislodged.

Figure 1:
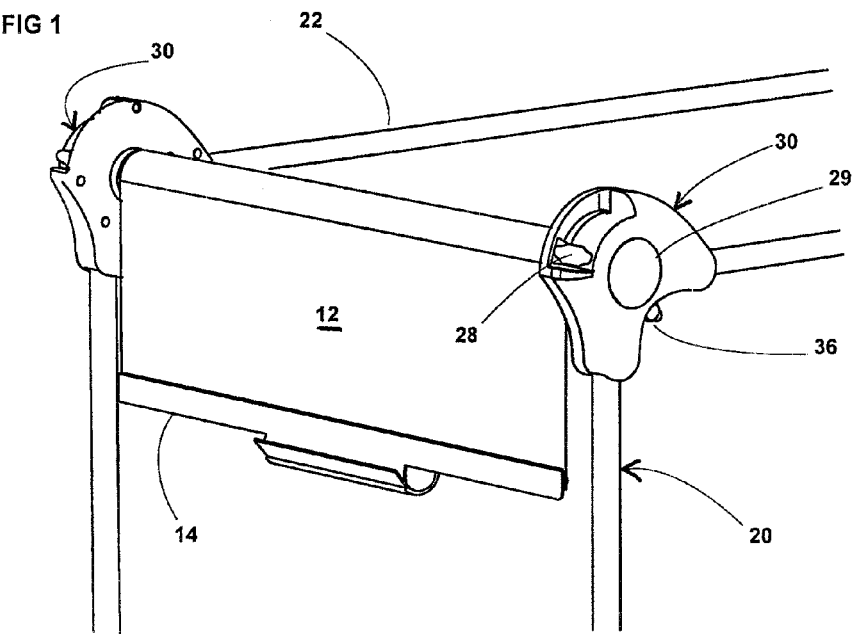
Figure 2:
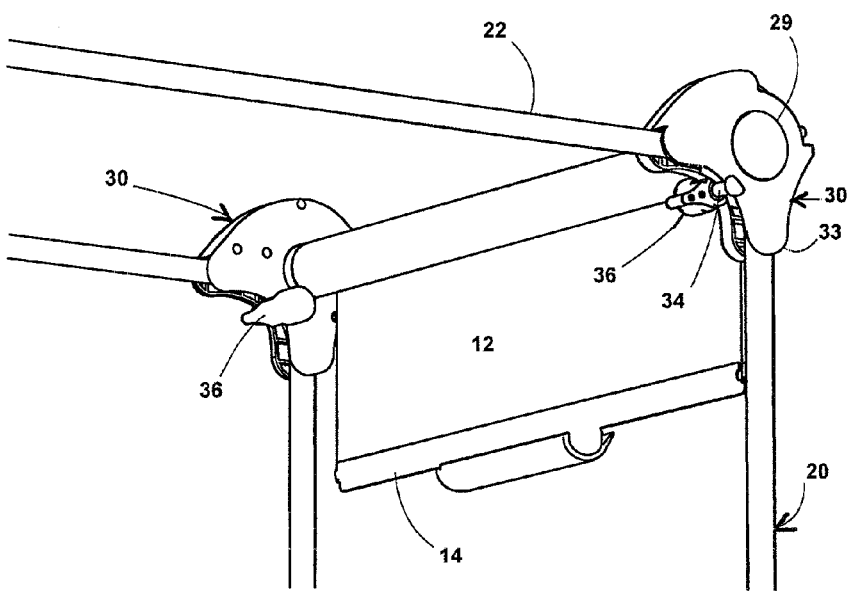
Figure 3:
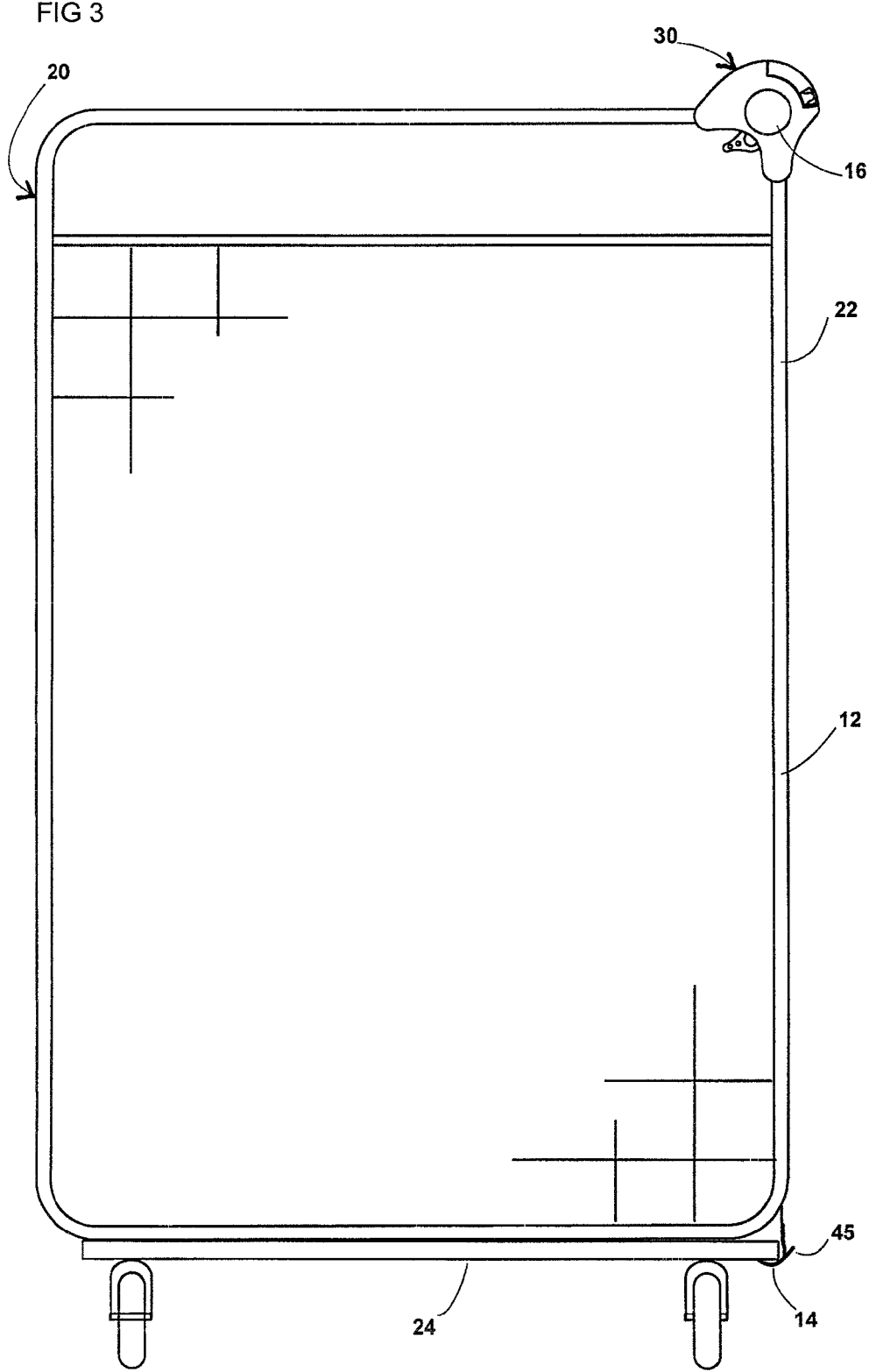
FIG. 3 is a schematic side view showing the same device as in FIGS. 1 and 2 fitted to a cage and in its fully extended condition.
Figure 4:
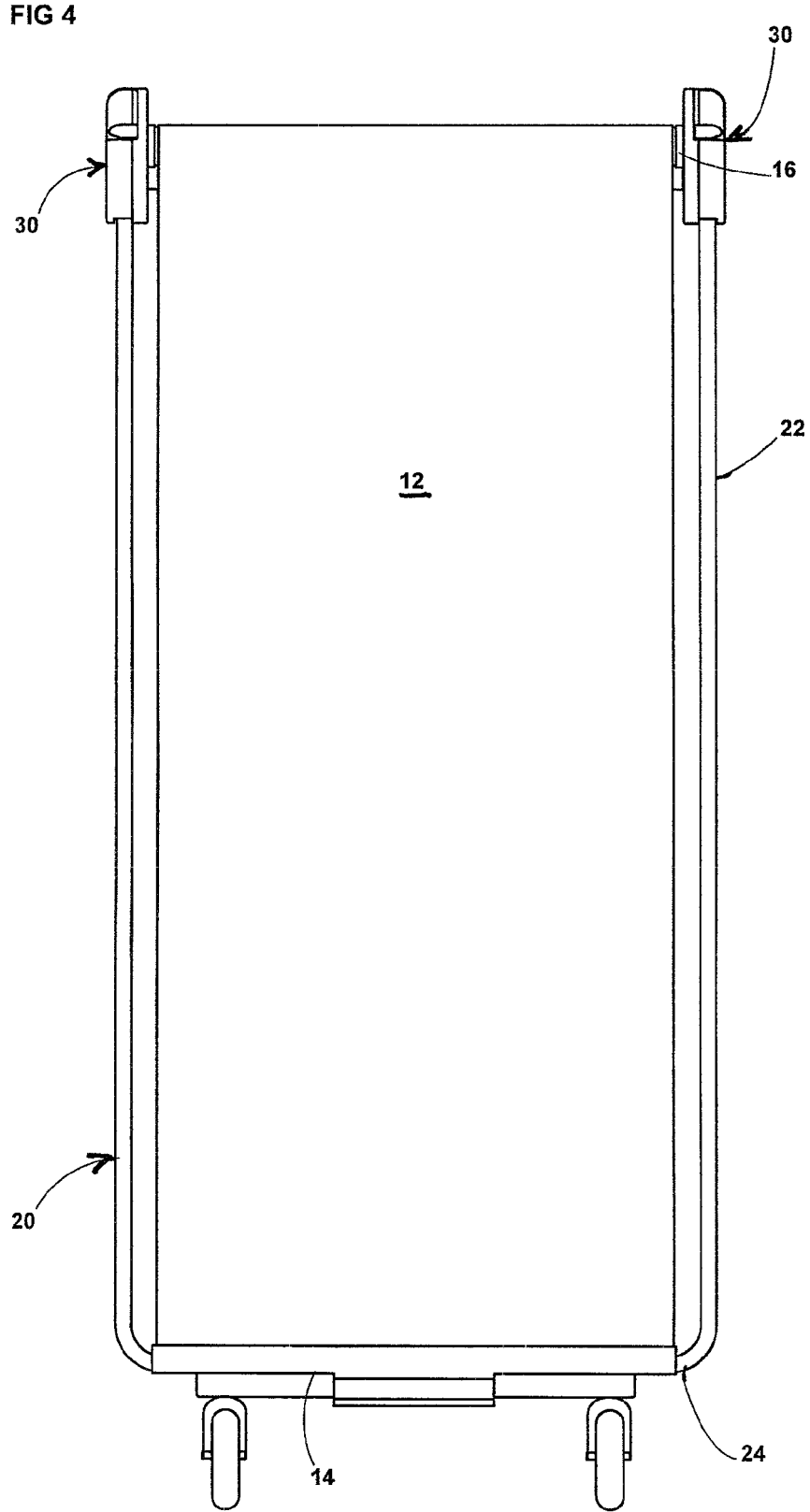
FIG. 4 is a schematic front view of the same device mounted onto a cage as in FIG. 3, also in its fully extended condition.

The flexible sheet 12 provides, when extended and engaged as shown in FIGS. 3 and 4, a surface on which advertising material may be displayed.

Figure 5:
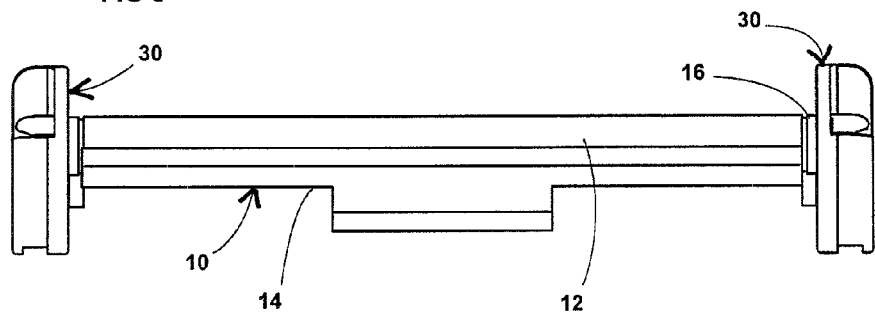
FIG. 5 is a front view of the same embodiment of protection device shown in FIGS. 1 to 4, now shown in a retracted condition.
Figure 6:
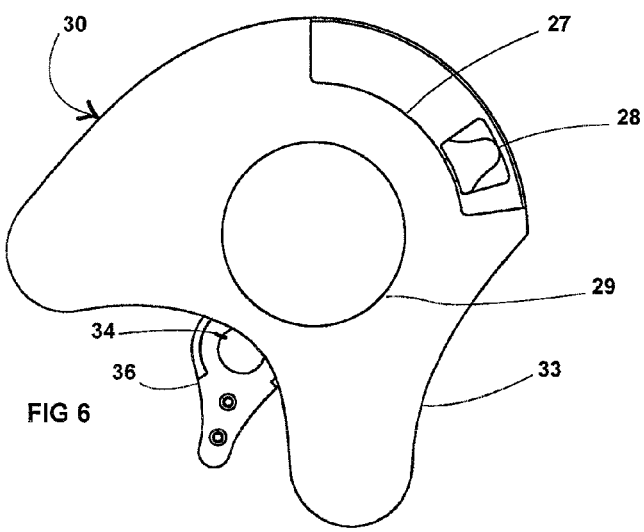
FIG. 6 is an enlarged scale side view of the same embodiment of the protection device of the invention as in the preceding figures.

For access to the cage 20 for purposes of loading and unloading, the channel element 14 is released from the bottom frame portion 24 and the ratchets 26 are released by depression of the levers 28 and the material 12 readily rewinds onto the roller 16 to the position shown in FIG. 5.

Whenever the cage 20 needs to be disassembled or folded down, the device can be disconnected and removed.

Figure 12:
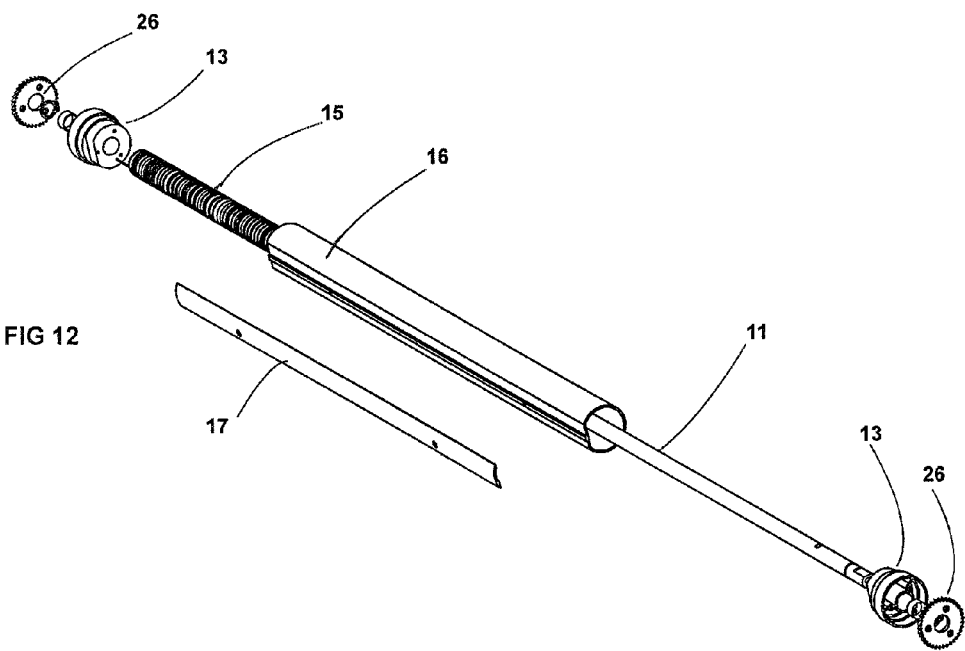
FIG. 12 is an exploded view of the reel assembly, at the centre of the protection device shown in the preceding figures, on to which the flexible sheet material is to be mounted.

Referring in more detail to FIG. 12, the tubular roller 16 is mounted over a central support shaft 11 with respective journals 13 at each end and with a tensioning spring 15 in the space between the shaft 11 and the roller 16 as is conventional in roller blinds. As already mentioned, respective ratchets 26 are mounted at each end of this roller assembly 10. A top edge of the fabric sheet 12 is attached to a flat sector of the roller surface by means of a locking bar 17 and pins 18 or bolts there through, as shown in FIG. 13.

The channel element 14 is similarly attached by pins 18 and a strip 19 at a bottom edge of the fabric sheet 12, as shown in FIG. 14. The element 14 is formed with an attachment limb 41 extending from an arcuate portion. One part 43 of the arcuate portion provides a hook for engagement under the bottom frame portion 24 of the supermarket cage, while a second part 45 of the arcuate portion, beyond the limb 21, is a part which can be got hold of, either manually by an operative, or by a robotic arm in order to engage or release the said element 14.

Figure 7:
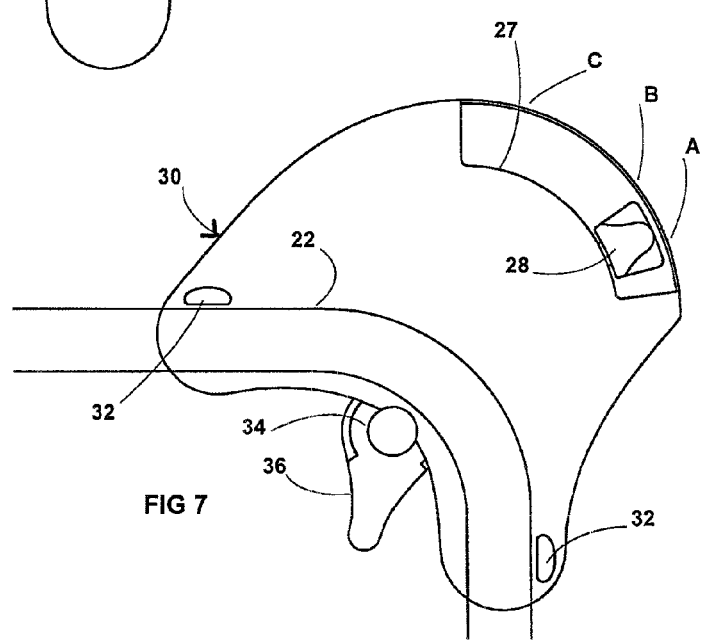
FIG. 7 is a schematic side view showing one of the brackets of the same embodiment of protection device as in FIG. 6 when fitted on to a supermarket cage but with an outer part of the bracket housing partially removed.
Figure 8:
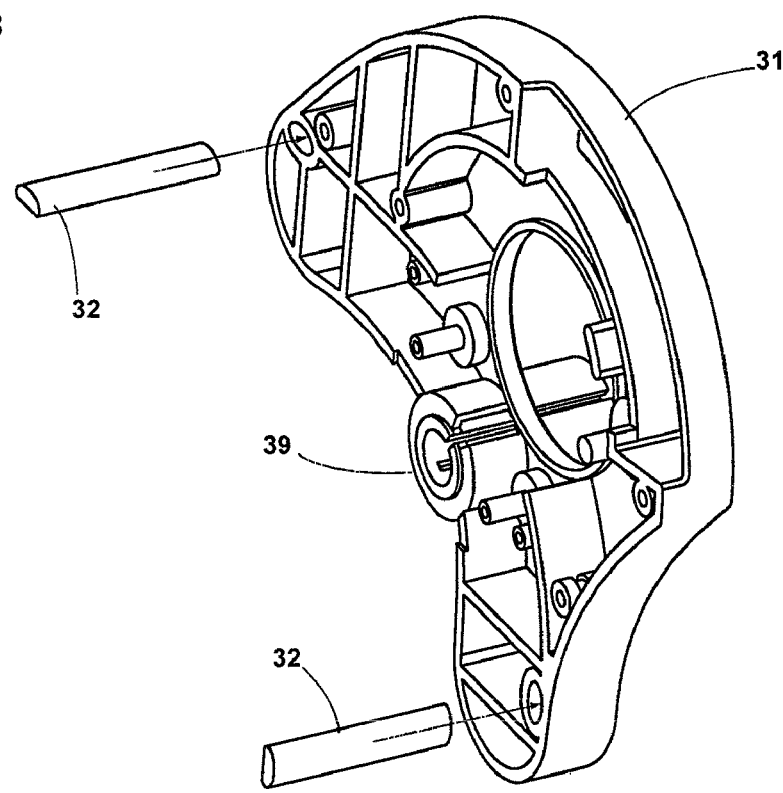
FIG. 8 is a similarly enlarged scale fragmentary perspective view of an inner housing part of the same bracket as shown in FIGS. 6 and 7.
Figure 9:
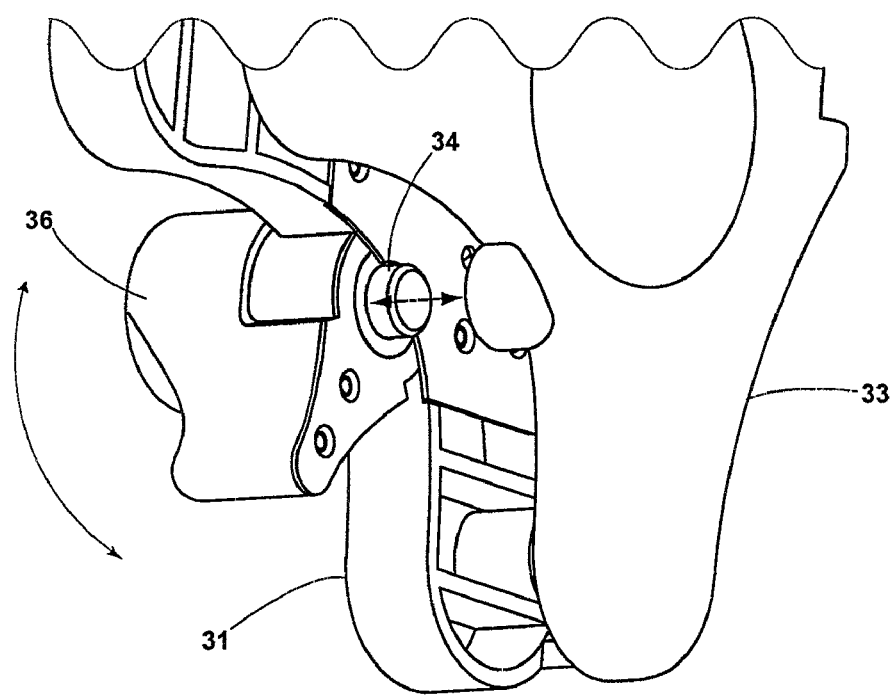
FIG. 9 is a further enlarged scale fragmentary perspective view of the lower part of the same bracket to show the shot bolt in greater detail.
Figure 10:
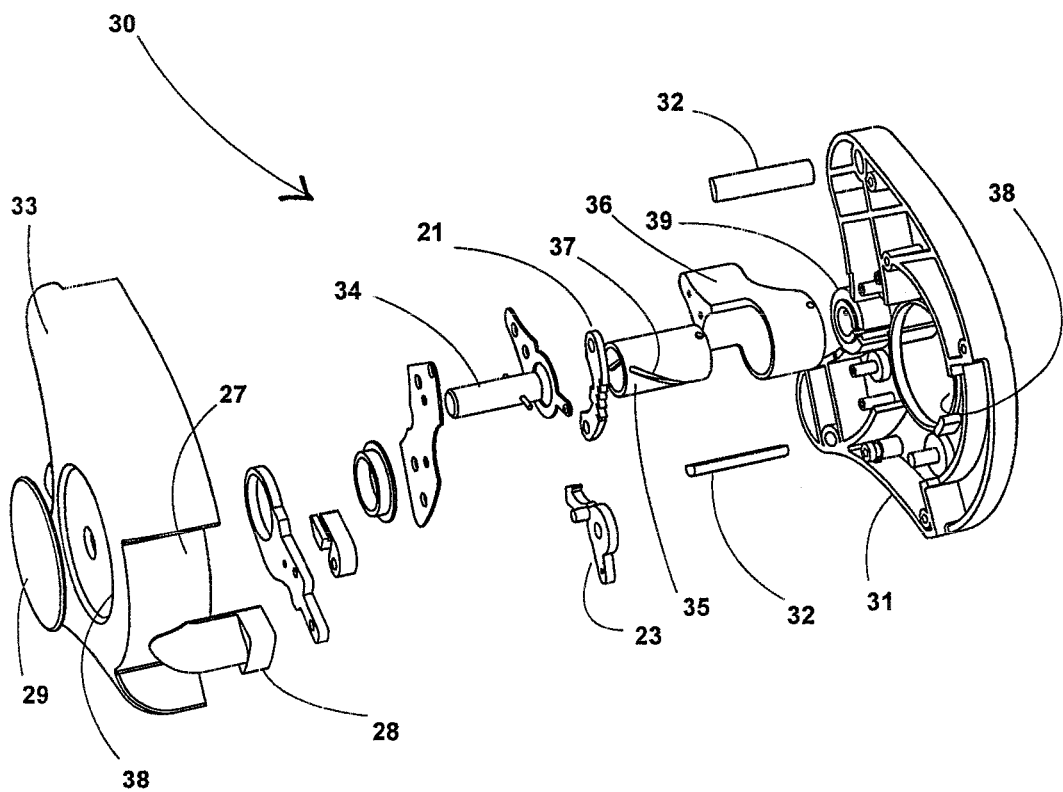
FIG. 10 is an exploded view of one bracket of the embodiment of protection device shown in the preceding figures.
Figure 11:
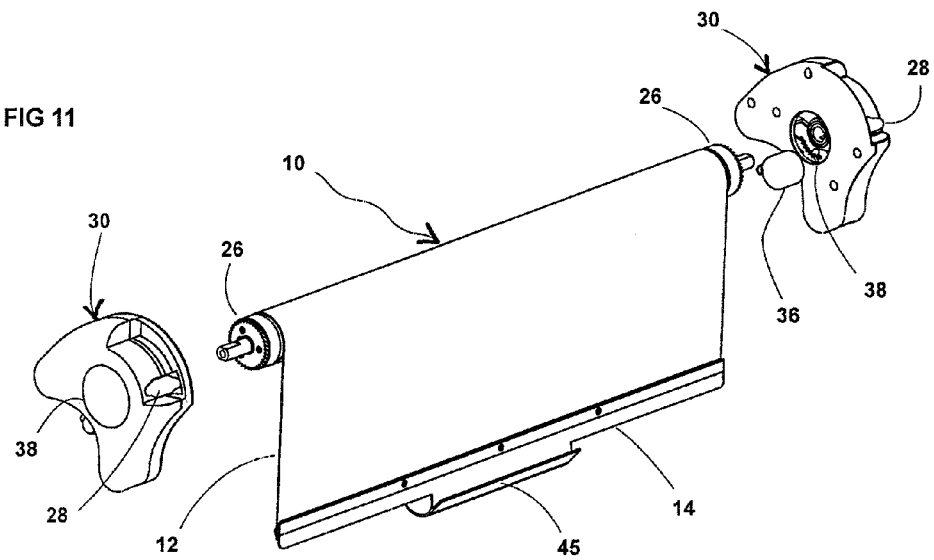
FIG. 11 is a reduced scale exploded view of the entire protection device as shown in the preceding figures.

Referring in more detail now to FIGS. 6 to 10, each of the end cap assemblies 30 is specially fabricated from inner and outer housing parts 31, 33 which fit together with other components there between as shown in FIG. 10. An opening remains in a lower face of the outer housing part 33 in order that a corner region of a supermarket cage side frame 22 may be inserted there through, as shown in FIG. 7. Each housing part 31, 33 is moulded from suitable plastics material with internal cross walls for strength and rigidity. Inserts in the form of pegs 32 fit between respective apertures formed in the cross walls of the respective housing parts 31, 33, as shown in FIGS. 7, 8 and 10, in order to define abutments for the supermarket cage side frame 22 and thereby fix the orientation of the end cap assembly 30. When the protection device is to be fitted to different versions of supermarket cage which may have different configuration side frame elements and/or different tubular diameter of side frame elements, different inserts are used upon manufacture of the end cap assemblies 30 in order to allow them to fit appropriately onto such other cage designs.

The inner housing part 31 is provided with a cylindrical projection 39 which mounts a shot bolt assembly including a bolt 34, a bolt drive cylinder 35 and a shot bolt lever 36, all of which are shown in FIG. 10. The cylinder 35 has a part helical slot 37 which provides a cam for a pin (not shown) on the bolt 34. By this means, a rotation of the shot bolt lever 36 of approximately 90° causes the bolt 34 to be projected or retracted, respectively. The shot bolt lever 36 is mounted at a position where it can readily be operated by the fingers of an operative gripping the respective end cap assembly 30 when it is mounted on an upper corner of a supermarket cage. When thus mounted, with the supermarket side frame element 22 located in the opening of the end cap housing 30, as explained above, the shot bolt 34, when projected, extends behind the side frame element 22 so as to hold the end cap assembly 30, and the entire device, securely in position, as is shown most clearly in FIGS. 7 and 9.

The outer housing part 33 mounts the above-mentioned lever 28 which serves to engage with the ratchet 26 at the respective end of the roller assembly 10. In this respect, the journals 13 and ratchets 26 of the roller assembly 10 fit into and through a central aperture 38 in each end cap 30, with the projecting ends of the central shaft 11 having respective cover plates 29 fitted thereto, as shown in FIG. 10. An actuator part of the lever 28 lies in a recess 27 in the outer housing part 33 and is readily operated by a thumb of an operative gripping the respective end cap assembly 30 when it is mounted on an upper corner of a supermarket cage. In a lower position A, as shown in FIG. 7, the levers 28 release the ratchets 26 so that the fabric sheet 12 can be pulled downwards from the roller 16. When the levers 28 are subsequently pushed upwards from rest position B to upper position C they serve to rotate the ratchets 26 and thereby tension the fabric sheet 12.

An additional safety feature may be provided by a ratchet interlock element 21, as shown in FIG. 10. This element engages the ratchet 26 and prevents its rotation in the direction to wind the fabric back onto the roller 16. This element 21 is pushed out of engagement with the ratchet 26 upon actuation of the shot bolt 34, for example by means of another lever 23 rotated by the shot bolt drive cylinder 35, and thereby allows the lever 28 to be operated to tension the sheet material 12. Therefore, it is not possible to tension the sheet material 12 unless the end cap 30 is correctly bolted onto the frame element 22 of the supermarket cage. In this way, it is evident to an operative when the end cap 30 or indeed the entire device is not locked into position on the cage 20.

FIGS. 1 to 14 show only a preferred practical arrangement which is particularly easy to fit to a supermarket cage, particularly easy to use, and also to remove, as required, and has features ensuring safety in use. Very many other practical implementations of the invention are possible. In particular various different means of mounting and of attachment of the brackets to the top or upper regions of the side frames of the cage are possible depending on the size and shape of the side frame members and other practical considerations and requirements.

For example, in other embodiments the roller may be mounted between brackets inside a housing which is clipped on to the cage. In other embodiments, an L-shaped profile pelmet or similar may be provided for housing the brackets for mounting the roller.

FIG. 15 illustrates an alternative shape and configuration for mounting brackets 48 for the roller assembly 10. In this embodiment a ratchet mechanism 42 for a roller 40 is shown with a release lever 44. Also, pins or bolts 46 or the like are shown for engagement behind a side frame member 22 of the cage to hold the brackets 48 or housing onto same securely. Such pins or bolts 46 may be designed to be easily inserted or released as required.

FIG. 16 illustrates a version where a roller housing 50 is designed to be centrally mounted, by means of respective side fitments 51, between the top of the side frames of the cage 20. Cage top extensions 52 are hingedly connected to the front and rear of the roller housing 50. These extensions 52 may fit across the top of the cage 20 and may serve as guides for the flexible material when it is drawn off the roller. In this respect, the material will firstly be drawn across the top of the cage and then downwards over the respective open end of the cage 20. Two rollers may be mounted in parallel in the housing 50 so that material from each can be drawn off to cover each open end of the cage.

The side fitments 51 or the top extensions 52 may also provide means, such as grooves, ledges or apertures to enable stacking of other similar cages on top of this one.

The foregoing is illustrative and not limitative of the scope of the invention. Features and component parts described in conjunction with a particular aspect, embodiment or example of the invention are to be understood to be applicable to any other aspect, embodiment or example described herein unless incompatible therewith.

The invention claimed is:

1. A supermarket cage assembly comprising a cage and a protection device adapted for fitting thereto, the cage comprising a wheeled base and opposing side frames mounted onto the base and extending upwards from the base leaving, between said side frames, at least one open end to the cage, and the protection device comprising at least one roller mounted between respective brackets, which are adapted to be fitted removably to opposing upper regions of the opposing side frames of the cage, and a sheet of flexible material mounted upon and extensible from the or each roller, so that when extended from the roller the sheet is able to cover the open end of the cage from the upper regions of the side frames to the wheeled base, said sheet also having means for its releasable securement at or adjacent the wheeled base of the cage, wherein each bracket of the protection device comprises an end cap assembly provided with an opening for insertion of a region of the cage side frame and a lever operated shot bolt which is extensible and retractable behind said side frame region.

2. The assembly according to claim 1 wherein the protection device includes a ratchet mechanism associated with at least one of the brackets to control or limit rotation of the or at least one of the rollers.

3. The assembly according to claim 1 wherein the protection device includes a spring mechanism associated with the or at least one of the rollers to enable automatic rewinding of the flexible sheet subsequent to its extension.

4. The assembly according claim 1 wherein the means for releasable securement of the flexible sheet when extended from the roller comprises a hook formation provided at the outer edge of the flexible sheet.

5. The assembly according to claim 4 wherein the hook formation comprises a profiled strip mounted along the outer edge of the flexible sheet.

6. The assembly according to claim 1 wherein the means for releasable securement of the flexible sheet includes a portion which can be gripped in order to effect securement and/or release of the said sheet.

7. The assembly according to claim 1 wherein the protection device comprises a single roller mounted between the respective brackets which are adapted to be fitted removably at opposing upper corner regions of the side frames at the open end of the supermarket cage.

8. The assembly according to claim 1 wherein the protection device comprises two rollers mounted in substantially parallel disposition between the respective brackets, the rollers each having a flexible sheet of material wound thereon and being so arranged that the respective sheets are initially extensible in generally opposing directions from the respective rollers.

9. The assembly according to claim 7 wherein the protection device further includes at least one top extension connected to the brackets and adapted for extending partially across an upper region of the space defined between the side frames of the cage.

10. The assembly according to claim 9 wherein the at least one top extension is hingedly connected to the brackets.

11. The assembly according to claim 9 wherein the at least one top extension provides support means for wheels of a further supermarket cage which may be stacked thereabove.

12. A supermarket cage protection device adapted for fitting to a supermarket cage comprising a wheeled base and opposing side frames mounted onto the base and extending upwards from the base leaving, between said side frames, at least one open end to the cage; said protection device comprising at least one roller mounted between respective brackets, which are adapted to be fitted removably to opposing upper regions of the opposing side frames of the cage, and a sheet of flexible material mounted upon and extensible from the or each roller, so that when extended from the roller the sheet is able to cover the open end of the cage from the upper regions of the side frames to the wheeled base, said sheet also having means for its releasable securement at or adjacent the wheeled base of the cage, wherein each bracket of the protection device comprises an end cap assembly provided with an opening for insertion of a region of the cage side frame and a lever operated shot bolt which is extensible and retractable behind said side frame region.

13. The device according to claim 12 further including a ratchet mechanism associated with at least one of the brackets to control or limit rotation of the or at least one of the rollers.

14. The device according to claim 12 further including a spring mechanism associated with the or at least one of the rollers to enable automatic rewinding of the flexible sheet subsequent to its extension.

15. The device according to claim 12 wherein the means for releasable securement of the flexible sheet when extended from the roller comprises a hook formation provided at the outer edge of the flexible sheet.

16. The device according to claim 15 wherein the hook formation comprises a profiled strip mounted along the outer edge of the flexible sheet.

17. The device according to claim 12 wherein the means for releasable securement of the flexible sheet includes a portion which can be gripped in order to effect securement and/or release of the said sheet.

* * * * *